United States Patent [19]

Carlow

[11] 3,792,360

[45] Feb. 12, 1974

[54] MULTI-FREQUENCY SIGNAL GENERATOR

[75] Inventor: Earl F. Carlow, Scottsdale, Ariz.

[73] Assignee: Motorola, Inc., Franklin Park, Ill.

[22] Filed: Aug. 14, 1972

[21] Appl. No.: 280,620

[52] U.S. Cl. ........................ 328/14, 328/27, 328/55, 328/155, 328/48

[51] Int. Cl. ........................ H03b 19/00

[58] Field of Search ...... 328/14, 155, 21, 27, 55, 48

[56] References Cited

UNITED STATES PATENTS

| | | | |
|---|---|---|---|
| 3,464,018 | 8/1969 | Cliff | 328/14 X |
| 3,513,412 | 5/1970 | Breetz | 328/14 X |
| 3,544,717 | 12/1970 | Smith | 328/155 |
| 3,665,323 | 5/1972 | Peterson | 328/14 |

*Primary Examiner*—John S. Heyman
*Attorney, Agent, or Firm*—Vincent J. Rauner

[57] ABSTRACT

The time taken to count up a binary counter is made adjustable by selectively phase-shifting a series of pulses passing into the counter and originating from a fixed frequency clock. The electronic pulses originating from the clock pass through a phase-shifting network, the shifting being responsive to and dependent upon digital data input in the form of electronic signals. A control circuit controls the phase-shifting network to produce a total counter cycle time that is representative of the digital data input. The output of the counter serves as an input to a sine wave synthesizer for providing an output sine wave of a frequency directly related to the state of the input digital data signal.

17 Claims, 6 Drawing Figures

MULTI-FREQUENCY SIGNAL GENERATOR

BACKGROUND OF THE INVENTION

FIELD OF THE INVENTION

Multi-frequency signal generators produce an analog output which is dependent on the state of a digital input and having particular application to systems known as frequency shift keying (FSK) systems. These outputs are sometimes referred to as audio tones Prior art FSK systems are responsive to digital inputs in the form of electronic pulses producing an analog output signal of one frequency if the input data is a "1" and at another frequency when the input digital data is a "0." These bi-level states are sometimes referred to as "mark" and "space" in radio-teleprinter systems. When the two frequencies are not synchronous at the point of frequency shifting from one to the other (0 to 1, or 1 to 0) extraneous frequencies may be introduced, in the prior art systems. In a typical FSK system, a 1 is represented at the output by a sine wave of a frequency of 1,070 Hz. For the same channel, a 0 is represented by a sine wave output of a frequency of 1,270 Hz. A second channel provides an output sine wave of 2,025 Hz representative of a 1 and a sine wave output of 2225 Hz representative of a 0. There is no harmonic relationship between these pairs of signals and therefore the prior art systems have had various provision to counteract faulty indications when switching from one digital state to the other.

One prior art system incorporates an LC oscillator circuit which oscillates at a frequency dependent upon its tank circuit. To change the frequency, other components are switched into the tank circuit. This system has the disadvantage of being slow because of the slow response of the LC tank circuit. This system also suffers from the disadvantage of being large in physical size and not subject to implementation by integrated circuit techniques. Finally, the transitional characteristics and frequency stability are temperature dependent, directly affecting performance.

Another system utilizes two crystal controlled oscillators and has control circuitry to permit either one or the other of the oscillators to produce an output sine wave from the system, depending upon the input data. This system has the disadvantage of requiring two independent crystal controlled oscillators which are expensive and which, of course, compound the problem of maintaining close frequency control. Furthermore, the two oscillators are not synchronized and in activating the control circuitry to respond to one or the other of the oscillators does not insure against spurious noise signals. This effect is particularly noticeable when one of the oscillators is at a maximum output while the other is at a minimum output and a sudden change takes place.

Another approach is one made by the applicant of this invention and taught in U. S. Pat. No. 3,518,522, assigned to the Assignee of this invention. In this prior art system, the modulus of a counter is selectively altered such that the counter output signal varies in frequency in accordance with the changing modulus of the counter. The system has the advantage of utilizing a single crystal controlled oscillator but has a disadvantage of requiring that the shift from one tone (or frequency) to the other occur only at a specific part of the tone half-cycle; otherwise, some distortion will be introduced. If several cycles of the tone frequency comprise a digital data bit, then the induced distortion is small. This prior art system therefore is limited to those applications where several cycles of the tone cycle are used per data bit.

BRIEF SUMMARY OF THE INVENTION

A control logic unit receives digital data in the form of bi-level signals. The control logic responds to the input digital data by activating certain units of a pulse frequency modulator. One activated unit of the pulse frequency modulator delays a train of pulses originating from a fixed frequency clock by a full time period.

The clock produces a series of pulses at a fixed frequency, independent of the input digital data. The output of the clock goes to a one-half cycle phase-shifter which is selectively activated to delay the pulse train by one-half of a time period. From the one-half cycle phase-shifter, the clock pulses are fed to the series of units of the pulse frequency modulator where the pulses are delayed by activated units of the modulator. The pulses are then passed to a simple binary counter whose time for counting is dependent upon the delays incurred through the phase-shifter and the pulse frequency modulator. In the particular embodiment described herein, the one-half cycle phase-shifter is activated only once during the formation of a sine wave output and then only in three out of four cases described. The one-half cycle phase-shifter is activated by the most significant bit of the counter thus assuring only one one-half phase shift for any full count.

In the preferred embodiment, two channels are used for the output sine wave. One channel utilizes a pair of frequencies that require a nine-bit counter and the other channel uses a higher pair of frequencies that requires only an eight-bit counter. In the latter case, the first bit of a nine-bit counter is disabled.

The sine wave outputs are uniquely generated by a sine wave synthesizer which receives selected bits of the counter and combines them to produce discrete voltage levels removed from each other by substantially equal time periods to form the desired sine wave, the time periods being determined by the time taken to count in the particular bit positions used as inputs to the sine wave synthesizer.

Since the control logic is responsive to the state of the bi-level digital data input signal, when that state changes, certain of the units of the pulse frequency modulator which had been activated for the prior state are deactivated and others which had been deactivated are activated. Thus the change from one frequency to another is spread throughout the entire counting cycle of the counter and the affect of generated noise is so minimized as to be insignificant.

The primary object of this invention is to provide a multi-frequency signaling system capable of asynchronously providing complete phase coherent modulation between two different frequency signals, without introducing noise into a communication channel.

Another object of this invention is to provide a multi-frequency signaling system having a single fixed frequency clock for providing pulses to a system capable of producing a plurality of frequencies of output sine waves.

Still another object of this invention is to provide a multi-frequency signaling system which is susceptible of implementation in integrated circuit form.

These and other objects will be made evident in the detailed description that follows.

DETAILED DESCRIPTION OF THE INVENTION

Figure 1:
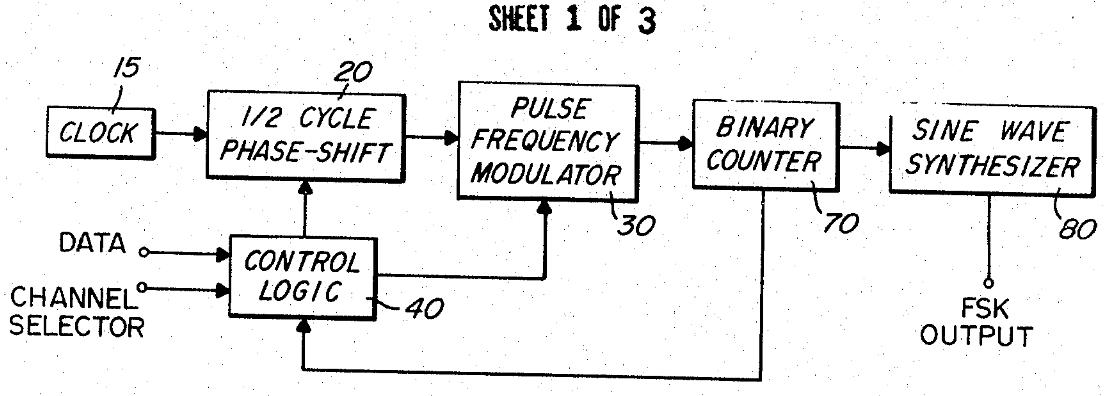
FIG. 1 is a block diagram of the multi-frequency signal generator.

FIG. 1 illustrates a clock 15 providing an input to one-half cycle phase-shifter 20. The output of phase-shifter 20 is connected to the input of pulse frequency modulator 30. In the preferred embodiment, there are a total of six units of the pulse frequency modulator 30, each identical to unit number 1. The output of unit 6 is connected to a binary counter 70 which has an output to and controls the sine wave generator 80. Control logic 40 has an input from binary counter 70 and has a channel select input which determines whether a channel ($\bar{C}$) employing frequencies 1,070–1,270 Hz or a channel (C) employing 2,025–2,225 Hz will be received. Control logic 40 also has a data input for receiving digital data represented by bi-level electronic pulses. When reference is made herein to a pulse, it should be understood that the arbitrary designation refers to a positive excursion for a brief period from a less positive voltage reference. A binary 1 is represented by a positive voltage and a binary 0 is represented by a less positive voltage. "Enabling" a gate is to condition the gate to pass a pulse while "disabling" a gate is to condition the gate to block a pulse.

Figure 2:
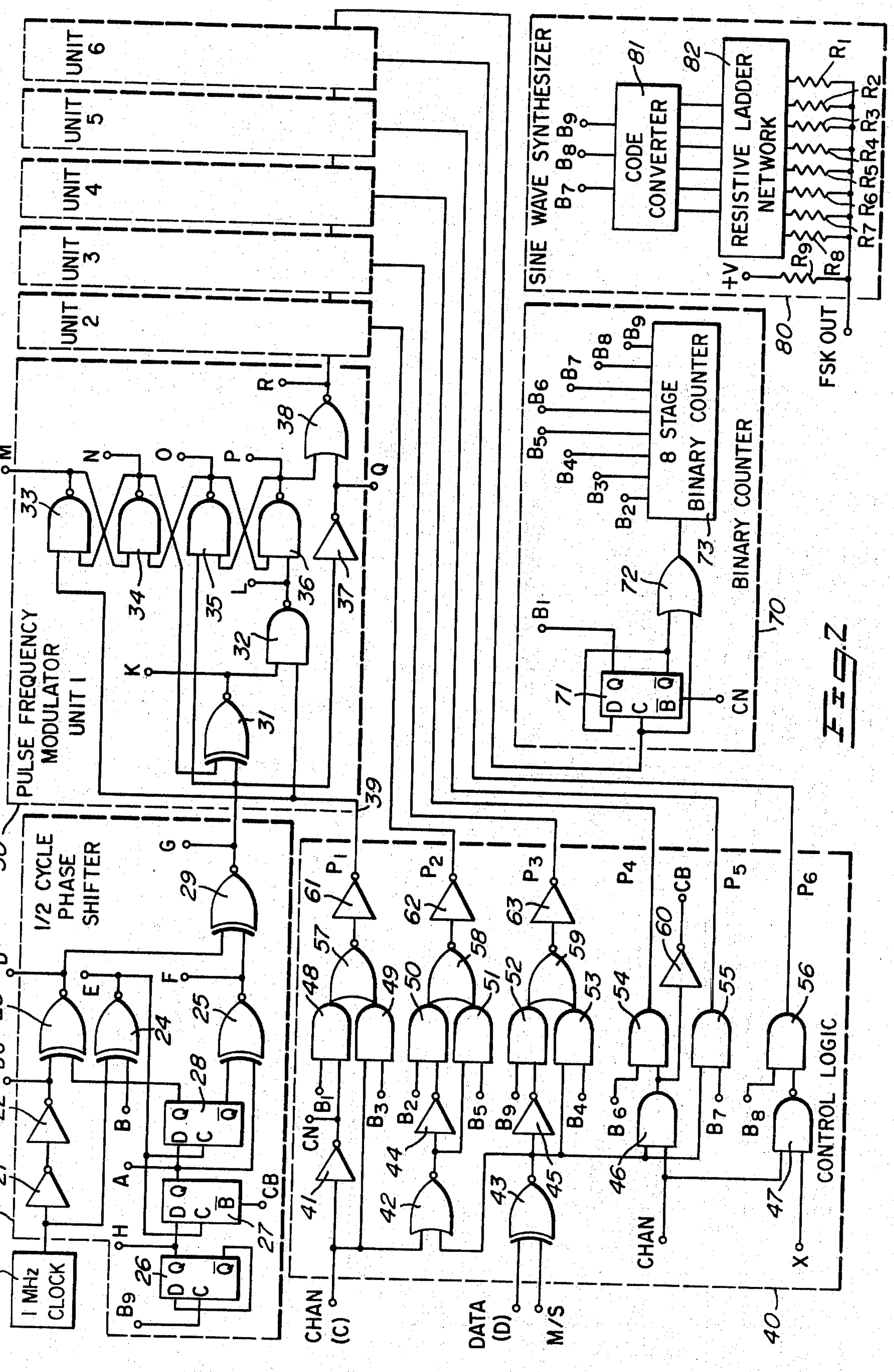
FIG. 2 is a partial schematic diagram of the multi-frequency signal generator.

Referring now to FIG. 2, a 1 mHz clock 15 provides a series of pulses to a one-half cycle phase-shifter 20. Specifically, inverter 21 receives the pulses from clock 15 and has its output connected to inverter 22. The output of inverter 22 serves as one input to exclusive NOR circuit 23 whose output serves as an input to NOR circuit 29, the output stage of the phase-shifter 20.

Clock 15 serves as an input to exclusive NOR circuit 24 whose output serves as the clock input to flip-flops 27 and 28. Flip-flop 26 has a clock input from $B_9$, the most significant bit of counter 70. The Q output of flip-flop 26 serves as the D conditioning input to flip-flop 26. The $\bar{Q}$ output of flip-flop 26 serves as the D conditioning input to flip-flop 27 whose Q output in turn serves as the D conditioning input to flip-flop 28. Flip-flop 27 has an input CB which, if a 0, will force flip-flop 27 to the reset or cleared state. The Q output of flip-flop 28 serves as the second input to both of exclusive NOR circuits 23 and 24. The $\bar{Q}$ output of flip-flop 28 serves as one input to exclusive NOR circuit 25 whose other input is the Q output of flip-flop 27. The output of exclusive NOR circuit 25 is the second input to NOR circuit 29, the output stage of the phase-shifter 20.

The output of NOR circuit 29 serves as an input to unit 1 of pulse frequency modulator 30, specifically serving as one input to NOR circuit 31, one input to NAND circuit 35 and as the input to inverter 37. The other input to NOR circuit 31 comes from the output of NAND circuit 34, which together with NAND circuit 33, forms a latch or simple flip-flop circuit. The output of NAND circuit 34 then also serves as an input to NAND circuit 33 whose output serves as an input to NAND circuit 34. The other input to NAND circuit 33 is provided on line 39 which is the output $P_1$ from control logic 40. Line 39 also serves as one input to NAND circuit 32 whose other input comes from the output of NOR circuit 31. NAND circuits 35 and 36 are cross-connected to form a latch or simple flip-flop and are also connected to the latch formed of NAND circuits 33 and 34. The output of NAND circuit 35 serves as the other input to NAND circuit 34 and also serves as an input to NAND circuit 36. The output of NAND circuit 36 serves as the other input to NAND circuit 35 and also serves as an input to NOR circuit 38 which is the output stage of this first pulse frequency modulator 30. The other input to NOR circuit 38 comes from inverter 37.

The remaining five units of pulse frequency modulator 30 are identical to that described above and are connected in series with the output of unit 6 serving as a clock input to flip-flop 71 of binary counter 70.

The control logic 40 has a channel designation C input into inverter 41, AND circuits 46 and 49, NOR circuit 42 and NAND circuit 47. There also is an input provided for data (D) and for a "mark-space" (M/S) each serving as an input to exclusive NOR circuit 43. The output of exclusive NOR circuit 43 will be 1 (arbitrarily designated as the more positive of two voltage states) when data is present regardless of the convention used. That is to say, if the data coming in is in the reverse sense from the arbitrary designations used in the design of this system, by simply activating the M/S input, the system is compatible with reverse data input.

AND circuit 48 has an input $B_1$ from the least significant bit of binary counter 70 and has a second input from the inverter 41. AND circuit 49 has its second input $B_3$ from the third stage of binary counter 70. AND circuit 50 has one input $B_2$ from the second stage of binary counter 70 and a second input from inverter 44 whose input comes from NOR circuit 42. The output of NOR circuit 42 also serves as an input to AND circuit 51 which has another input $B_5$ from the fifth stage of binary counter 70. AND circuit 52 has an input $B_9$ from the most significant bit of binary counter 70 and has its second input from inverter 45 whose input comes from exclusive NOR circuit 43. The output from exclusive NOR circuit 43 serves as an input to AND circuit 53 whose other input $B_4$ is from the fourth stage of binary counter 70. AND circuit 54 has an input $B_6$ from the sixth stage of binary counter 70 and a second input from AND circuit 46. AND circuit 46 has one input from exclusive NOR circuit 43 and a second input conditioned by the channel C. AND circuit 55 has as one input an output from exclusive NOR circuit 43 and as another input $B_7$ from the seventh stage of binary counter 70. AND circuit 56 has an input $B_8$ from the eighth stage of binary counter 70 and another input from NAND circuit 47. NAND circuit 47 is conditioned by the channel C and also has an input from inverter 45.

AND circuits 48 and 49 serve as inputs to NOR circuit 57 which serves as an input to inverter 61. The output of inverter 61 selectively activates unit 1 of the pulse frequency modulator 30. This activation will be discussed later in detail.

AND circuits 50 and 51 serve as inputs to NOR circuit 58 which serves as an input to inverter 62 whose output goes to the unit 2 of the pulse frequency modulator 30.

AND circuits 52 and 53 serve as inputs to NOR circuit 59 which serves as an input to inverter 63 which in turn serves as an input to unit 3 of the pulse frequency modulator 30.

AND circuit 54 serves as an input directly to unit 4 of the pulse frequency modulator 30.

Inverter 60 has its input from AND circuit 46, and provides an output to the $\bar{R}$ terminal of flip-flop 27 of the phase-shifter 20.

AND circuit 55 has an output directly connected to unit 5 of the pulse frequency modulator 30.

The output of AND circuit 56 is directly connected to unit 6 of the pulse frequency modulator 30.

Binary counter 70 is comprised of a first stage flip-flop 71 and an eight stage counter section 73. As will be described later, for one channel ($\bar{C}$), all nine stages of counter 70 are required and for the other channel (C) only eight stages are required. In the latter circumstance, flip-flop 71 is essentially bypassed by action of input CN to the S input of flip-flop 71 which comes from inverter 41 of the control logic. The Q output of flip-flop 71 is $B_1$, the least significant stage of the counter, connected to the control logic as described above. The $\bar{Q}$ output of flip-flop 71 serves as the D conditioning input of flip-flop 71 and as an input to OR circuit 72. The clock input to flip-flop 71 comes from unit 6 of pulse frequency modulator 30 output. The other input to OR circuit 72 also comes from unit 6 of pulse frequency modulator output. The output of OR circuit 72 goes to the binary counter 73 which is comprised of either flip-flops conventionally connected together to form a well-known binary counter.

The sine wave generator 80 has a code converter 81 with inputs $B_7$, $B_8$ and $B_9$ from the binary counter 70. Resistive ladder network 82 has six inputs from the code converter 81 and is used to selectively provide current flow through weighted resistors $R_1 - R_8$. $R_9$ serves as a biasing resistor. The details of the sine wave generator are the subject of a co-pending patent application, assigned to the assignee of this invention, Ser. No. 277,713, filed Aug. 3, 1972.

MODE OF OPERATION

Figure 5:
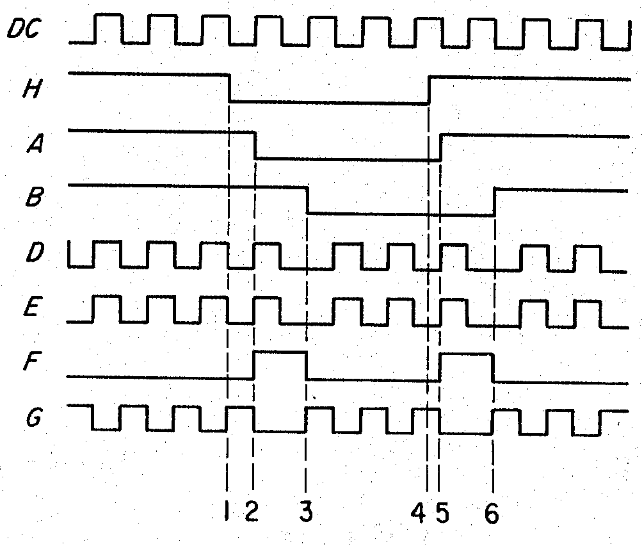
FIG. 5 illustrates idealized signals at various points in the one-half cycle phase-shifter of FIG. 2.

Referring to the one-half cycle phase-shifter 20 of FIG. 2 and to the idealized signals of FIG. 5, the operation of the phase-shifter will be made evident. The one-half cycle phase-shifter, illustrating a more sophisticated version, is the subject of a co-pending patent application, assigned to the assignee of this invention, Ser. No. 217,909, filed Mar. 6, 1972, now U.S. Pat. No. 3,755,748. The signals of FIG. 5 do not illustrate the actual delays through the various circuits. The signal "DC" is representative of the clock 15 output after it has passed through inverters 21 and 22. Signal H represents the Q output of flip-flop 26 which, for purposes of illustration, starts in the 1 state. This is an arbitrary selection and flip-flop 26 therefore could have been in the 0 state. Since flip-flop 26 is in the 1 state, the $\bar{Q}$ output, which is the D conditioning input of flip-flop 26, is a 0 and when the most significant bit $B_9$ of counter 70 becomes a 1, flip-flop 26 is cleared to 0 as shown at time 1 of FIG. 5.

Flip-flop 27, which is wired to follow flip-flop 26 has an input from exclusive NOR circuit 24 in the form of signal E which follows the clock signal DC at time 2, clearing flip-flop 27.

Flip-flop 28 is wired to follow flip-flop 27 and has as its clock input signal E, the output from exclusive NOR circuit 24. The Q output of flip-flop 27 is shown as signal A seen going from 1 to 0 at time 2. This causes the output of exclusive NOR circuit 25 to go to 1 as represented by signal F at time 2. When signal F goes to 1, NOR circuit 29 is deactivated as indicated by signal G.

Flip-flop 28 is wired to follow flip-flop 27 and therefore when signal E goes positive at time 3, flip-flop 28 is cleared as indicated by signal B which illustrates the Q output of flip-flop 28. When signal B goes to 0 exclusive NOR circuits 23 and 24 are both disabled as indicated by signals D and E respectively.

In Boolean form, the output of exclusive NOR circuit 25 is represented by the equation:

$$F = A \cdot \bar{B} + \bar{A} \cdot B \tag{1.}$$

Therefore at time 2, when A goes to 0 and $B$ remains a 1, $F$ becomes a 1 and stays in that state until $B$ goes to 0.

The equation for the output signal G of the one-half cycle phase-shifter is as follows:

$$G = \bar{D} \cdot \bar{F} \tag{2.}$$

At time 2, when both $D$ and $F$ equal 1, $G$ goes to 0 and remains in that state until time 3. At time 3, $F$ goes to 0 and $D$ is already 0, therefore $G$ goes to 1. An examination of signal G reveals that between times 2 and 3, there is no output from the phase-shifter and the pulse starting at time 3 is shifted in the delaying direction by one-half of one cycle. It is therefore apparent that changing the state of flip-flop 26 whose Q output is illustrated by signal H from 1 to 0 results in the output signal $G$ being delayed by one-half of one cycle. If no subsequent change occurs in the state of flip-flop 26, the output signal $G$ does not shift, as shown, between times 3 and 4.

At time 4, flip-flop 26 changes state because of $B_9$ again going to 1. This time however, flip-flop 26 is set to a 1 as illustrated by signal H. Flip-flop 27, following flip-flop 26, is set to a 1 at time 5 as illustrated by signal A. Flip-flop 28, following flip-flop 27, is set to a 1 at time 6 as illustrated by signal B. At time 5, signal F again goes to a 1 because equation number 1 is satisfied in that signal $A$ is 1 and signal $B$ is 0. Signal F, going to a 1, disables NOR circuits 29 as illustrated by signal $G$ between times 5 and 6. At time 6, signals $F$ and $D$ each equal 0 therefore satisfying equation 2, causing signal $G$ to go to 1. An examination of signal G reveals that there is no pulse between times 5 and 6 and the pulse beginning at time 6 is again delayed by one-half of one cycle. After time 6, with no further change in state of flip-flop 26, the output G of the phase-shifter 20 is a series of equally spaced pulses.

Referring again to FIG. 2, a $\bar{R}$ input is shown to flip-flop 27 having a CB signal applied thereto. When *CB* equals 1, the operation of flip-flop 27 is as described above. However, when *CB* equals 0, flip-flop 27 is cleared and signal *A* goes to 0, staying in that state irrespective of the input. This clearing action is done to avoid the one-half cycle phase-shift when $B_9$ goes to 1 in the case of a desired output frequency of 2,025 Hz, representing a 1 digital input. The *CB* input comes from inverter 60 of the control logic 40. The output of inverter 60 is represented by the equation:

$$CB = \bar{C} + \bar{D} \quad (3)$$

When $C = 1$, a higher pair of frequencies is indicated and when $D = 1$ a digital 1 input is indicated. Thus *CB* = 0 only when both *C* and *D* equal 1. The forced clear state of flip-flop 27 precludes the above-described operation, preventing the one-half cycle phase-shift. It should be noted that when flip-flop 27 is originally cleared, the forced clearing by *CB* being equal to 0 has no affect. However, if flip-flop 27 had been set to the 1 state and then force cleared, a one-half cycle phase-shift delay would have occurred. However, any such change would have resulted from a change in input data and therefore an averaging of that change throughout the counter cycle would occur. The one-half phase-shift is completely insignificant when compared with the gross change required during the counter cycle.

Figure 3:
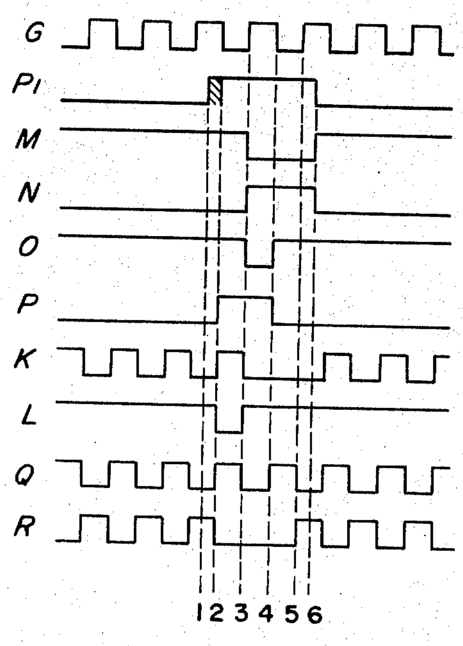
FIG. 3 illustrates idealized signals at various points of the pulse frequency modulator of FIG. 2.

For an understanding of the operation of the pulse frequency modulator 30, reference should be made to FIGS. 2 and 3. Assuming that there is no enabling signal $P_1$ from the control logic 40, then the pulses G from NOR circuit 29 of the phase-shifter should pass directly through unit 1 of the pulse frequency modulator 30 without delay. When unit 1 of the pulse frequency modulator 30 is in this deactivated state, the latch or flip-flop formed by NAND circuits 33 and 34 is in the cleared state so that the output M of NAND circuit 33 is a 1 and the output N of NAND circuit 34 is a 0. In like manner, the flip-flop formed by NAND circuits 35 and 36 is cleared with the 0 output of NAND circuit 35 equal to 1 and the P output of NAND circuit 36 equal to 0.

The *G* signal comes into NOR circuit 31 whose other input is the N signal output from NAND circuit 34 which is in the 0 state. The output of NOR circuit 31 represented by signal *K* is mathematically expressed:

$$K = \bar{G} \cdot \bar{N} \quad (4)$$

This equation indicates that whenever *G* goes to 0, there will be an output from NOR circuit 31. An examination of FIG. 3 illustrates this fact and signal *K* is seen to be the inverse of input signal *G*.

Signal *K* serves as an input to NAND circuit 32 whose other input is $P_1$ on line 39 from the control logic 40. The equation for the output of NAND circuit 32 is:

$$L = \bar{K} + \bar{P}_1 \quad (5)$$

This equation makes it clear that the output of NAND circuit 32 is 0 only when each of its inputs equal 1. Since $P_1$ equals 0, signal *L* remains a 1 as may be seen in FIG. 3.

Signal *Q* is the output of inverter 37 and simply an inversion of input signal *G*. It provides one input to NOR circuit 38 which serves as the output stage of unit 1 of the pulse frequency modulator 30. The other input *P* from NAND circuit 36 is a 0. The output signal *R* is defined by the equation:

$$R = \bar{Q} \cdot \bar{P} \quad (6)$$

Whenever signals *Q* and *P* are each 0, there is an output *R* from NOR circuit 38. Without consideration for delays in the circuits, the *R* signal is seen to be an exact reproduction of the input signal *G*.

Now, assume that new data is received in the control logic 40 and, for reasons to be explained later, unit 1 of the pulse frequency modulator 30 must be activated. The output of inverter 61 of the control logic 40 then goes to a 1 as represented by signal $P_1$ of FIG. 3. This change may come at any time and is asynchronous with the clock 15 output. This asynchronous condition is shown by the cross-hatch section of signal $P_1$ from time 1 to time 2. Following the transition of $P_1$ to a 1, input signal *G* goes to 0 which causes L to go to 0 as indicated by equation 5 since both signals *K* and $P_1$ equal 1 at time 2 when *G* goes to 0. When *L* goes to 0, then the output P of NAND circuit 36 must go to 1 because, as in the case of NAND circuit 32, both inputs must equal 1 for the output *P* to equal 0. Equation 6 indicates that the output NOR circuit 38 is disabled when *P* equals 1.

At time 3, signal *G* goes to 1, the output 0 of NAND circuit 35 goes to 0 because both of its inputs equal 1, the output *N* of NAND circuit 34 goes to 1 because both of its inputs are no longer equal to 1, and the output *M* of NAND circuit 33 goes to 0 because both of its inputs are 1's. NOR circuit 38 remains disabled as indicated by signal *R*.

At time 4, when signal *G* again goes to 0, the output O of NAND circuit 35 goes to 1 because both of its inputs are no longer equal to 1. This causes the output *P* of NAND circuit 36 to go to 0 because both of its inputs are 1. At time 5, input signal G again goes to 1. Signal Q, the output of inverter 37 has been unaffected by the circuit action described above and therefore has uninterruptedly been the simple inversion of input signal G. Therefore at time 5, *Q* goes to 0. Signal *P*, the output of NAND circuit 36, went to 0 at time 4 and therefore equation 6 is satisfied and output signal *R* goes to 1. An examination of signal *R* reveals that there is no pulse between times 2 and 5 and therefore an entire pulse is "missing." Input signal *G* has therefore been delayed by a full cycle through the action described above.

At some later time 6, the activation signal $P_1$ goes to 0 in asynchronous fashion. NAND circuits 33 and 34 change states as indicated by signals *M* and *N* because of changed input conditions in exactly the same manner as previously described.

The purpose for turning on any of the pulse frequency modulators 30 will now be described starting with a reference to the following table:

TABLE I

| Frequency | Period, μ sec. | Basic cntr. | Additional time | Closest time | Result freq. | percent |
|---|---|---|---|---|---|---|
| 1070 | 934.5 | 512 | 422.5 | 422.5 | 1,070.09 | .008 |
| 1270 | 787.4 | 512 | 275.4 | 275.5 | 1,269.84 | .01 |
| 2025 | 493.8 | 256 | 237.8 | 238 | 2,024.29 | .03 |
| 2225 | 449.4 | 256 | 193.4 | 193.5 | 2,224.69 | .01 |

Assuming that the clock 15 of FIG. 2 operates at a frequency of 1 mHz, then its period is 1 microsecond. Therefore the time required to complete a count in the binary counter 70 with an unaltered input originating at the clock 15 is 512 microseconds. To provide a sine wave output indicative of a 1 digital input in the lower frequency channel ($\bar{C}$), a period of 934.5 microseconds is required to produce the desired frequency of 1,070 Hz. A straight count through the nine stages of counter 70 would result in a total time of 512 microseconds and therefore 422.5 must be added to attain the desired period of 934.5 microseconds. This is accomplished by turning on selected ones of the pulse frequency modulator 30 units, and in addition, turning on the one-half cycle phase-shifter 20 once during the counter cycle to obtain the 0.5 microsecond increment required. The above table indicates that additional time is required for the 0 case ($\bar{D}$) to produce a frequency of 1,270 Hz and likewise to produce 2,225 Hz when $C = 1$. In the case of $D = 1$ when $C = 1$, it should be noted that there is no requirement to turn on the one-half cycle phase-shifter 20 and therefore when that case comes up, the input $CB$ to the $\bar{R}$ terminal of flip-flop 27 of phase-shifter 20 goes to 0, disabling the phase-shifter as described earlier.

The pulse frequency modulator 30 is activated to cause a full cycle phase shift as indicated by signal $R$ of FIG. 3. This phase-shift results in a slowing of the counter 70. The individual units of phase-shifter 30 are activated by the stages of the counter 70 in addition to the channel selected and the digital data input.

Figure 4:
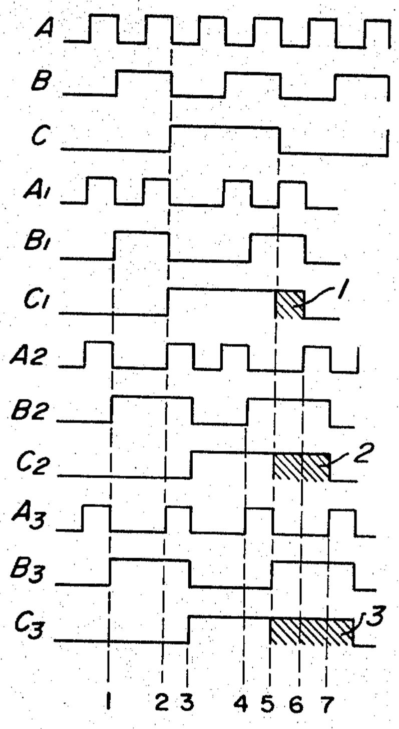
FIG. 4 illustrates idealized signals of a three-bit counter having pulses delayed by a pulse frequency modulator.

Reference should now be made to FIG. 4 where the signals present in a sample three-stage counter are shown in idealized form. A represents the least significant bit, $B$ represents the intermediate bit and $C$ represents the most significant bit. Signals $A$, $B$ and $C$ represent the stages of the three-bit counter being counted without any delaying of the input to that counter. Assuming a 1 mHz input rate, it can be seen that there are 8 microsecond time periods required to count from "000" through "111" back to "000". Note that the leading edge of each pulse of the output A of the least significant bit is unique. That is to say, it does not occur when the leading edge of the output B of the intermediate stage goes to 1 nor when the leading edge of the output C of the most significant bit goes to 1. Each is unique and that uniqueness is used to turn on a pulse frequency modulator.

For example, if there were a need to make the total cycle time of this three-bit counter equal 9 microseconds, then obviously 1 microsecond would be required to be added to the total time. An examination of signals A, B and C reveals that signal C, the output of the most significant bit, changes from 0 to 1 only once during the cycle. Then the output of the most significant bit can be used to activate a pulse frequency modulator once during the cycle of the counter. This activation is indicated by signals $A_1$, $B_1$ and $C_1$. The signal $A_1$ is constant in frequency until $C_1$ goes to 1. Then the pulse frequency modulator is activated and $A_1$ is delayed by a full cycle. The total time to count is indicated by signal $C_1$ which is 9 microseconds. The additional microsecond is indicated by the cross-hatch section of signal $C_1$.

If it is desired to extend the counting time by 2 microseconds, it can be seen by an examination of signals A, B and C that signal B goes positive twice during the total count. Thus the output of the intermediate stage may be used to activate a pulse frequency modulator twice during the total count. An examination of signals $A_2$, $B_2$ and $C_2$ illustrates the waveforms when there is a complete phase shift twice during the counter cycle. That is, when signal $B_2$ goes positive at time 1, signal $A_2$ is delayed until time 2. When signal $B_2$ goes positive again at time 4, signal $A_2$ is delayed until time 6. The cross-hatch section of signal $C_2$ indicates the 2 μSec delay in the 10 microsecond total counter cycle.

If it were desired to delay the total count time by 3 microseconds, then both signals B and C could be used to activate pulse frequency modulators. An examination of signals $A_3$, $B_3$ and $C_3$ illustrates that when $B_3$ goes positive at time 1, signal $A_3$ is delayed until time 2. When signal $C_3$ goes positive at time 3, signal $A_3$ is delayed until time 4, and when signal $B_3$ goes positive at time 5, signal $A_3$ is delayed until time 7. The three microsecond delay resulting in a total counter cycle of 11 microseconds is shown as the cross-hatch section of signal $C_3$.

If a delay of four microseconds were desired, then signal A would be used to activate a pulse frequency modulator because it changes from 0 to 1 four times during the counter cycle. If a 5 microsecond delay were desired, then signals A and C would be used. A 6 microsecond delay can be achieved by using signals A and B. Finally, a 7 microsecond delay is attainable using signals A, B and C.

The following table is illustrative of the bits of the nine bit counter 70 that must be used to activate selected units of the pulse frequency modulator 30.

TABLE II

| REQUIRED TIME | $B_1$ | $B_2$ | $B_3$ | $B_4$ | $B_5$ | $B_6$ | $B_7$ | $B_8$ | $B_9$ | D | C |
|---|---|---|---|---|---|---|---|---|---|---|---|
| 422 | 1 | 1 | 0 | 1 | 0 | 0 | 1 | 1 | 0 | 1 | 0 |
| 275 | 1 | 0 | 0 | 0 | 1 | 0 | 0 | 1 | 1 | 0 | 0 |
| 238 | 0 | 1 | 1 | 1 | 0 | 1 | 1 | 1 | 0 | 1 | 1 |
| 193 | 0 | 1 | 1 | 0 | 0 | 0 | 0 | 0 | 1 | 0 | 1 |

In the first row of Table II, when a total delay of 422 microseconds is required to achieve frequency 1,070, indicating $D = 1$ and $C = 0$, the bits of the counter 70 that will be used to activate selected units of the pulse frequency modulator 30 are indicated by a 1. The least significant stage $B_1$ of counter 70 changes from 0 to 1 a total of 256 times during one counter cycle. Bit $B_2$ changes from 0 to 1 a total of 128 times. Bit $B_4$ changes a total of 32 times, bit $B_7$ changes a total of 4 times and bit $B_8$ changes a total of twice. Adding these changes from 0 to 1 yields a total of 422 microseconds, the desired delay.

In like manner, the desired delays of 275 microseconds, 238 microseconds and 193 microseconds are achieved using the counter bits as indicated in Table II. It should be noted at this time that when $C = 1$, $B_1 = 0$. Referring again to Table I, above, it can be ascertained that when $C = 1$, the nine bits of counter 70 cannot be used because the counter cycle is 512 microseconds which exceeds the period required for $C = 1$. As mentioned earlier, flip-flop 71 of binary counter 70 is the lowest order stage of the counter and is bypassed when $C = 1$. This bypassing action will be described below.

Referring again to Table II, it can be seen that the achievement of the four delays should involve the sharing of selected units of the pulse frequency modulator 30. For example, when a delay of 422 microseconds or a delay of 275 microseconds is desired, $B_1$ is used in common to activate a unit and also $B_8$ is commonly used to activate a unit. The efficient combination of the leading edges of the various signals $B_1 - B_9$ is achieved in the logic section 40 of FIG. 2. The output $P_1$ of inverter 61 is used to activate unit 1 of the pulse frequency modulator 30. $P_1$ is represented by the Boolean equation:

$$P_1 = B_1 \cdot \bar{C} + B_3 \cdot C \quad (7.)$$

This equation illustrates that when $C = 0$, the leading edge of bit $B_1$ is used to activate unit 1 of pulse frequency modulator 30, or when $C = 1$, $B_3$ is used to activate unit 1.

$$P_2 = B_2 \cdot (C + D) + D_5 \cdot (\overline{C + D}) \quad (8)$$

Equation 8 illustrates that whenever $C$ or $D$ equal 1, $B_2$ is used to activate unit 2. Also, when $C$ and $D$ each equal 0, $B_5$ is used to activate unit 2.

$$P_3 = B_4 \cdot D + B_9 \cdot \bar{D} \quad (9)$$

Equation 9 illustrates that whenever $D = 1$, $B_4$ is used to activate unit number 3. Whenever $D = 0$, $B_9$ is used to activate unit 3.

$$P_5 = B_6 \cdot C \cdot D \quad (10)$$

Bit $B_6$ activates unit 5 only when both $C$ and $D$ equal 1.

$$P_5 = B_7 \cdot D \quad (11)$$

Whenever $D = 1$, $B_7$ is used to activate unit 5.

$$P_6 = B_8(D + \bar{C}) \quad (12)$$

Equation 6 indicates that only when $C$ and $\bar{D}$ each equal 1 will bit $B_8$ not activate unit 6.

The 6 units of pulse frequency modulator 30 are connected in series. As the pulses come from one-half cycle phase-shifter 20 they are delayed by each of the selected units one full cycle whenever activated by the inputs $P_1 - P_6$ in accordance with the respective Boolean equations.

As an illustrative example, when $D = 1$ and $C = 1$, an output frequency of 2,025 Hz is required. Table I indicates that a total period of 493.8 microseconds is necessary and that an additional time of 237.8 microseconds is required to be added to the basic counting time of eight bits of the binary counter section 73. This is achieved by having $B_2$ turn on unit 2 a total of 128 times, $B_3$ turn on unit 1 a total of 64 times, $B_4$ turn on unit 3 a total of 32 times, $B_6$ turn on unit 4 a total of 8 times, $B_7$ turn on unit 5 a total of 4 times, and $B_8$ turn on unit 6 a total of 2 times. As noted earlier, this particular desired frequency requires that there be no one-half phase-shift and therefore flip-flop 27 is held cleared.

Also, th least significant bit of counter 70 must be disabled for this particular combination. This is done by taking output CN from inverter 41 ($\bar{C}$) and applying it to the $\bar{S}$ input of flip-flop 71 which is the lowest order stage of binary counter 70. When $CN = 0$, flip-flop 71 is force set to a 1 and the $\bar{Q}$ output becomes 0. Therefore OR circuit 72 is enabled to react to the series of pulses coming from unit 6 of pulse frequency modulator 30. $CN = 0$ when $C = 1$. When $CN = 1$, flip-flop 71 is not force set and reacts to the pulses from unit 6 in ordinary counting fashion as is necessary when $C = 0$. If one of the other three frequencies is required, the output $CB$ of inverter 60 equals 1, and flip-flop 27 of one-half cycle phase-shifter 20 is not held cleared to 0 and acts normally to produce a one-half cycle phase-shift when the most significant bit $B_9$ goes to 1.

Figure 6:
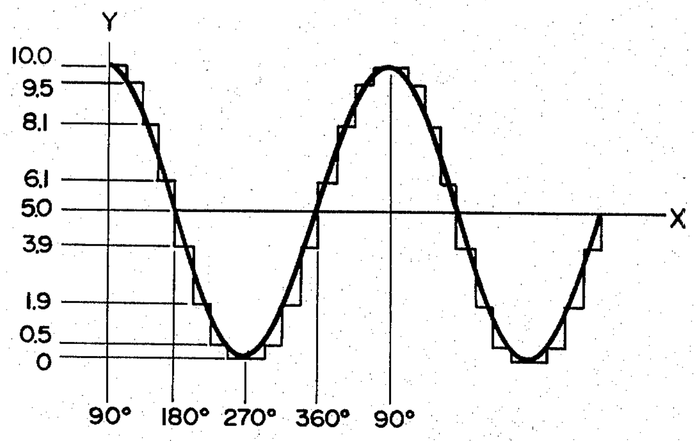
FIG. 6 shows the FSK output sine wave.

Using this technique, the desired counter cycle is obtained. The output of binary counter 70 is required to synthesize a sine wave of the period corresponding to the counter cycle time. In the preferred embodiment, the three most significant bits of counter stage 73 serve as inputs to code converter 81 of sine wave synthesizer 80. Code converter 81 supplies a unique enable consisting of three inputs in combination of $B_7$, $B_8$ and $B_9$ so that all eight possible combinations are present. Resistors $R_1 - R_8$ are weighted to provide a particular voltage reference when current flows separately through each resistor, through a selected gate to ground. The resultant sine wave is shown as FIG. 6. For a detailed description of this sine wave synthesizer, the above cited co-pending patent application Ser. No. 277,713, filed Aug. 3, 1972 should be studied. This embodiment is preferred because of its simplicity, economy and speed, but it is understood by those with ordinary skill in the art that there are many sine wave synthesizers available and this invention is not limited to using the inventive sine wave synthesizer of this preferred embodiment.

The implementation of the preferred embodiment is in integrated circuit form, specifically comprised of complementary metal oxide silicon (CMOS) circuitry. The invention is, of course, not limited to such implementation and may take other forms of integrated circuitry, or discrete components. Furthermore, the specific implementation of the preferred embodiment requires particular manipulation of logic and those with skill in the art realize that the ultimate logic results may be achieved using different combinations from the specific preferred embodiment without departing from the spirit and scope of this invention.

I claim:

1. A multi-frequency signaling system having a source of periodic pulses, for receiving digital data in the form of electronic signals and digital waveform synthesizer output means for producing an analog signal output whose frequency is representative of the digital data input comprising:

a. a phase-shifting network, adapted to receive the periodic pulses, for selectively shifting the phase of the periodic pulses by one-half of one periodic pulse and for selectively delaying the phase of the periodic pulses by one periodic pulse;

b. binary counting means, adapted to receive the pulses from the phase-shifting network, having output means operatively connected to the digital waveform synthesizer output means and to the phase-shifting network, and having further output means; and c. control means, connected to the further output means, responsive to the count of the binary counting means, operatively connected to the phase-shifting network for selectively permitting the phase shifting means to operate at a prescribed count and for selectively causing the modulation means to operate at least at one selected count.

2. The system of claim 1 wherein the phase-shifting network further comprising:

a. i. one-half cycle phase-shifting means, adapted to receive the periodic pulses, for selectively shifting the phase of the periodic pulses by one-half of one periodic pulse; and ii. pulse frequency modulation means, adapted to receive the pulses from the phase-shifting means, for selectively delaying the phase of the periodic pulses by one periodic pulse.

3. The system of claim 1 wherein the control means further comprise:

c. i. input means for receiving the digital data electronic signals; and ii. frequency indicia means for receiving an electronic channel indicator, the control means being responsive to the indicator, in combination with the digital data electronic signals and at least one prescribed count of the binary counting means, for causing the pulse frequency modulation means to operate to extend the counting means cycle time.

4. The system of claim 3 wherein the binary counting means further comprise a binary counter having *n* flip-flop stages.

5. The system of claim 4 wherein the flip-flop of the least significant stage of the binary counter is operatively connected to respond to the frequency indicia means for selective bypassing to effectively change the counter to a binary counter having *n–l* stages.

6. The system of claim 4 wherein the pulse frequency modulation means further comprise at least one unit having:

enabling means, adapted to be conditioned by the control means;

delaying means, operatively connected to the enabling means, for delaying the periodic pulses by one periodic pulse when the enabling means are conditioned; and bypass means, for directing the periodic pulses away from the delaying means and through the pulse frequency modulation means without delay when the enabling means are not conditioned.

7. The system of claim 5 wherein the pulse frequency modulation means further comprise a plurality of units, connected in series, for selective activation, each unit comprising:

enabling means, adapted to be conditioned by the control means;

delaying means, operatively connected to the enabling means, for delaying the periodic pulses by one periodic pulse when the enabling means are conditioned; and bypass means, for directing the periodic pulses away from the delaying means and through the pulse frequency modulation means without delay when the enabling means are not conditioned.

8. The system of claim 7 wherein the enabling means further comprise a first and second latch circuit.

9. The system of claim 8 wherein the bypass means further comprise an output gate having an input from the one-half cycle phase-shifting means and an input from the output of the second latch circuit for disabling the output gate when the second latch circuit is conditioned.

10. The system of claim 9 wherein the delaying means further comprise a first gate, having an input from the one-half cycle phase-shifting means and an input from the first latch circuit for disabling the first gate when the latch circuit is conditioned, and a second gate having an input from the output of the first gate, responsive to the control circuit for disabling the second gate when the first gate is disabled.

11. The system of claim 10 wherein $n = 9$ and the output of the stages are designated $B_1$, $B_2$, $B_3$, $B_4$, $B_5$, $B_6$, $B_7$, $B_8$ and $B_9$, in succession, where $B_1$ is the output of the least significant stage and $B_9$ is the output of the most significant stage, each of the outputs serving as an input to the control means.

12. The system of claim 11 wherein the digital data electronic signal input is in the form of pulses wherein a 1 is designated $D$ and a 0 is designated $\bar{D}$, and the channel indicator is designated $C$ when it is in the 1 state and designated $\bar{C}$ when it is in the 0 state, and wherein the pulse frequency modulation means is comprised of six units.

13. The system of claim 12 wherein the control means has one output connected to each of the six units, the outputs being designated $P_1$, $P_2$, $P_3$, $P_4$, $P_5$ and $P_6$, the control means being wired to establish the following respective logic configurations:

$$P_1 = B_1 \cdot \bar{C} + B_3 \cdot C$$
$$P_2 = B_2 \cdot (C + D) + D_5 \cdot (\overline{C + D})$$
$$P_3 = B_4 \cdot D + B_9 \cdot \bar{D}$$
$$P_4 = B_6 \cdot C \cdot D$$
$$P_5 = B_7 \cdot D$$
$$P_6 = B_8 \cdot C \cdot D$$

14. The system of claim 1 wherein the phase-shifting network further comprises:

a. iii. one-half cycle phase-shifting means, adapted to receive the periodic pulses, for selectively delaying the phase of the periodic pulses by one-half of one periodic pulse; and iv. pulse frequency modulation means, adapted to receive the pulses from the phase-shifting means, for selectively delaying the phase of the periodic pulses by one periodic pulse.

15. A method of providing a sine wave whose frequency is indicative of the binary state of a digital input, comprising the steps of:

a. generating a series of periodic pulses;

b. selectively shifting the phase of the periodic pulses by one-half of one periodic pulse, responsive to the digital input;

c. selectively delaying the phase of the periodic pulses by one periodic pulse, responsive to the digital input;
d. causing a counter to count the selectively shifted and selectively delayed periodic pulses; and
e. synthesizing a sine wave output whose period is equal to the cycle time of the counter.

16. A method of providing a sine wave whose frequency is indicative of the binary state of a ditital input and of a channel designation, comprising the steps of:

a. generating a series of periodic pulses;
b. receiving the digital input;
c. receiving a voltage level indicative of a channel designation;
d. selectively delaying the phase of the periodic pulses by one-half of one periodic pulse;
e. selectively delaying the phase of the periodic pulses by one periodic pulse;
f. causing a counter of *n* stages to count the selectively shifted and selectively delayed periodic pulses;
g. combining selected ones of the output of the *n* stages with the digital data and the channel designation in logic fashion to cause the selective delaying by one-half of one periodic pulse and by one periodic pulse; and
h. synthesizing a sine wave output whose period is equal to the cycle of time of the counter.

17. The method of claim 16 wherein the step of synthesizing a sine wave output further comprises:

h. i. providing a plurality of weighted resistors;
ii. selectively causing a current to flow through each weighted resistor providing a voltage level at each resistor, the time of selection being dependent upon the binary contents of selected stages of the counter; and
iii. filtering the waveform formed by the voltages to provide a smoothed sine wave.

* * * * *